(12) United States Patent
Foulsham et al.

(10) Patent No.: US 12,512,728 B2
(45) Date of Patent: Dec. 30, 2025

(54) ELECTRIC MOTOR COOLING ARRANGEMENT

(71) Applicant: GKN Automotive Limited, Birmingham (GB)

(72) Inventors: John Foulsham, Hampshire (GB); Daniel Beeby, Oxfordshire (GB); Andre Santos, Maia (PT)

(73) Assignee: GKN Automotive Limited, Birmingham (GB)

( * ) Notice: Subject to any disclaimer, the term of this patent is extended or adjusted under 35 U.S.C. 154(b) by 224 days.

(21) Appl. No.: 18/257,618

(22) PCT Filed: Dec. 22, 2020

(86) PCT No.: PCT/EP2020/087643
§ 371 (c)(1),
(2) Date: Jun. 15, 2023

(87) PCT Pub. No.: WO2022/135696
PCT Pub. Date: Jun. 30, 2022

(65) Prior Publication Data
US 2024/0113595 A1    Apr. 4, 2024

(51) Int. Cl.
*H02K 9/193*    (2006.01)
(52) U.S. Cl.
CPC ......... *H02K 9/193* (2013.01); *H02K 2209/00* (2013.01)
(58) Field of Classification Search
CPC .................................................... H02K 9/193
See application file for complete search history.

(56) References Cited

U.S. PATENT DOCUMENTS

| | | | |
|---|---|---|---|
| 5,682,074 A | 10/1997 | Di Pietro et al. | |
| 5,740,967 A * | 4/1998 | Simmons | C23F 1/04 239/596 |
| 6,016,969 A | 1/2000 | Tilton et al. | |

(Continued)

FOREIGN PATENT DOCUMENTS

DE    102016211593 A1 * 12/2017
JP    3289913 B2    6/2002
(Continued)

OTHER PUBLICATIONS

Heidrich (DE 102016211593 A1) English Translation (Year: 2017).*
(Continued)

*Primary Examiner* — Tulsidas C Patel
*Assistant Examiner* — Robert E Mates
(74) *Attorney, Agent, or Firm* — Reising Ethington P.C.

(57) ABSTRACT

An electric motor comprises: a motor housing, a stator connected to the motor housing, wherein the stator comprises first stator end-windings and second stator end-windings, a rotor rotatable relative to the stator, a driveshaft connected to the rotor in a rotationally fixed manner, wherein the driveshaft is rotatably supported in the motor housing about an axis of rotation, wherein an axial cooling arrangement is arranged axially adjacent and radially overlapping one of the first and second stator end-windings, wherein the axial cooling arrangement comprises a fluid chamber with a plurality of nozzles distributed in circumferential direction and directed towards said one of the first and second stator end-windings.

15 Claims, 6 Drawing Sheets

(56) References Cited

U.S. PATENT DOCUMENTS

| | | | |
|---|---|---|---|
| 6,639,334 B2 | 10/2003 | Chen et al. | |
| 10,272,767 B1* | 4/2019 | Tang | F01P 5/10 |
| 2012/0133222 A1 | 5/2012 | Han et al. | |
| 2014/0217842 A1* | 8/2014 | Kikuchi | H02K 9/19 |
| | | | 310/54 |
| 2019/0006914 A1* | 1/2019 | Graves | F16H 57/0423 |

FOREIGN PATENT DOCUMENTS

| | | |
|---|---|---|
| WO | 2018001608 A1 | 1/2018 |
| WO | 2018030371 A1 | 2/2018 |
| WO | 2018225878 A1 | 12/2018 |
| WO | 2020032026 A1 | 2/2020 |
| WO | 2020069744 A1 | 4/2020 |

OTHER PUBLICATIONS

International Search Report and Written Opinion for PCT/EP2020/087643 mailed Sep. 24, 2021 (12 pages).

International Preliminary Report on Patentability for PCT/EP2020/087643 mailed Apr. 5, 2023 (25 pages).

* cited by examiner

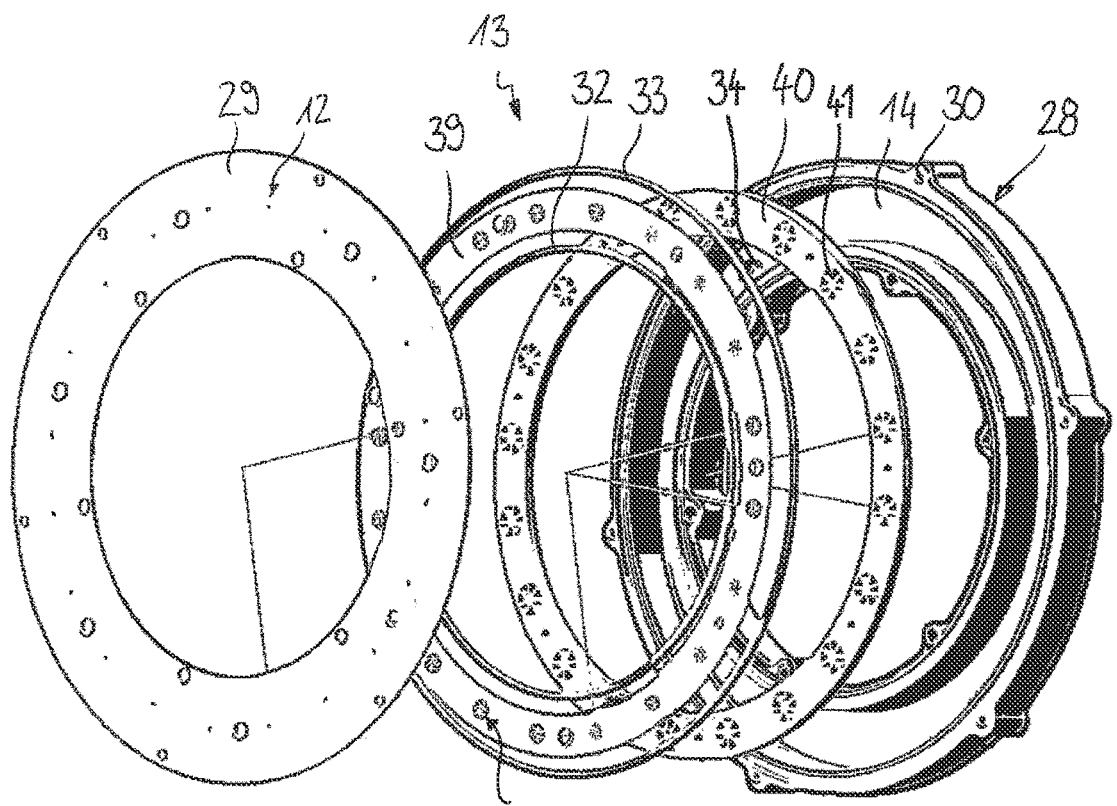
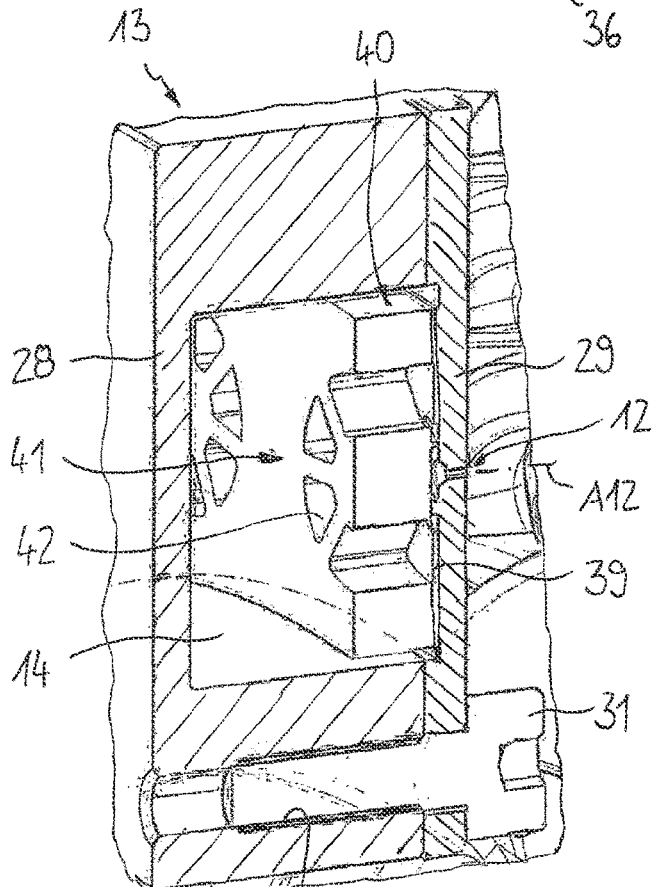
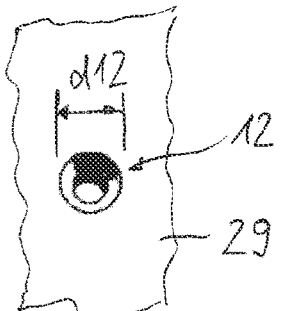
Fig. 4
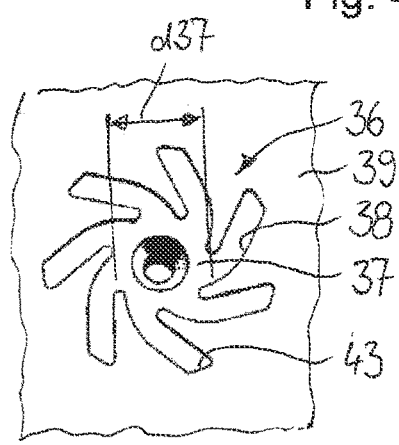
Fig. 5
Fig. 2
Fig. 3

ELECTRIC MOTOR COOLING ARRANGEMENT

CROSS-REFERENCE TO RELATED APPLICATIONS

This application is a national stage of, and claims priority to, Patent Cooperation Treaty Application No. PCT/EP2020/087643, filed on Dec. 22, 2020, which application is hereby incorporated herein by reference in its entirety.

BACKGROUND

From U.S. Pat. No. 5,682,074 B an electric vehicle motor is known including a hollow rotor shaft rotatably supported in a casing. A cylindrical rotor core is fixed to the shaft and a stator core is fixed to the casing. The stator core has a plurality of stator slots and a plurality of windings disposed in the stator slots. Oil spray nozzle retainer rings are mechanically affixed to end bells of the casing respectively so as to be in flow communication with the cooling oil flowing through end bell channels. Each oil spray nozzle retainer ring contains a plurality of nozzles disposed therein for spraying cooling oil onto the motor components. Nine nozzles are equally spaced circumferentially around each of the oil spray nozzle retainer rings to spray cooling oil directly onto a radial inner circumferential face of the stator windings.

From WO 2018 001608 A1 an electric machine is known comprising a housing that encloses a stator with an electric winding. The electric winding of the stator forms a winding head, which can be sprayed with a fluid via openings of a fluid channel, at each of the end faces of the stator. The fluid channel is arranged on the inner circumference of the housing as a separate line and comprises nozzles in order to spray the fluid of the fluid channel into the housing, in particular onto the winding heads of the electric winding.

From U.S. Pat. No. 6,639,334 B2 an assembly for cooling an electric motor, a method for transferring heat between a stream of impinging fluid and the surface of an electric motor end-winding, and an electric motor comprising a jet impingement cooling assembly are known. The assembly comprises a housing, a stator, a rotor, a winding, an end-winding integrally formed with the winding, and a jet impingement device operable for exposing the end-winding to a temperature-controlled stream of fluid.

From US 2019 0006914 A1 a system and method for cooling a power transmission is known. Oil is provided through an aperture defined in a housing to a stator cooling ring, through the stator cooling ring and into stator cooling channels, through the stator cooling channels and into spaces defined between the housing and jet rings, and through holes in the jet rings and onto the end-windings. The stator cooling ring, stator cooling channels and jet rings can encircle the stator and end-windings and, via the holes in the jet rings, spray pressurized jets of oil from various angles onto the end-windings, and in particular middle regions thereof.

From WO 2020/069744 A1 an electric drive is known comprising a housing assembly, an electric machine with a hollow shaft; a planetary transmission, and a power distribution unit with an input part and two output parts. The housing assembly has a first housing part on the motor side, a second housing part on the transmission side, and an intermediate housing part arranged therebetween. A sealed cavity for a coolant flowing through same is formed between the outer surface of a casing section of the intermediate housing on the motor side and the inner surface of the first housing part.

Motor performance of electric motors is thermally limited in operation. Inherent losses may occur in the copper, iron and magnets of electric motors, where material properties limit the temperatures of the respective components and structures. Effective cooling allows increases in torque and/or speed performance, which in turn reduces the size and cost of the active parts.

SUMMARY

The present disclosure relates to an electric motor with a cooling arrangement for a driveline of a motor vehicle, and a method for controlling a cooling arrangement of an electric motor.

The electric motor can have good cooling properties, high efficiency, and a compact size. Furthermore, a method for controlling a cooling arrangement of an electric motor can be highly efficient.

An electric motor is disclosed, comprising: a motor housing; a stator connected to the motor housing, wherein the stator comprises first stator end-windings and second stator end-windings; a rotor rotatable relative to the stator; a driveshaft connected to the rotor so as to rotate jointly with same, wherein the driveshaft is rotatably supported in the housing about an axis of rotation; and an axial cooling arrangement which is arranged axially adjacent and radially overlapping one of the first and second stator end-windings, wherein the axial cooling arrangement comprises a fluid chamber with a plurality of nozzles distributed in circumferential direction and directed towards said one of the first and second stator end-windings.

An advantage of the electric motor is that the axial cooling arrangement including a separate fluid chamber and a plurality of nozzles forms a simple and effective array of spray generators, which can remove a significant amount of heat from the end windings and other adjacent and connected components. By providing the axial cooling arrangement axially adjacent and with a radial overlap with respect to the stator end-windings, the cooling fluid can be sprayed directly onto said end-windings. In this connection the term radially overlapping is supposed to include that at least a portion of the axial cooling arrangement is arranged within the radial extension between a radial inner diameter and a radial outer diameter of the stator end-windings. This ensures that the fluid is sprayed effectively onto said end-windings.

It is to be understood that a first axial cooling arrangement may be provided facing the first stator end-windings, and/or that a second axial cooling arrangement may be provided facing the second stator end-windings. By providing an axial cooling arrangement on both sides of the stator, effective cooling of the electric motor can be achieved. The number of nozzles can be selected according to the cooling requirements. For example, at least two, at least four or at least six or more nozzles can be provided with are distributed in circumferential direction, e.g., evenly distributed over the circumference.

According to an embodiment, the cooling chamber may have an annular form such that the drive shaft may extend through a central through-opening of the annular cooling arrangement. For example, the cooling chamber or at least parts thereof may be connected to the motor housing coaxially to the driveshaft, thereby defining an annular reservoir with the circumferentially distributed nozzles being arranged vis a vis to the stator end-windings. The fluid chamber can be formed by a fluid housing including a base member connected to the motor housing and a cover portion fixed to the base member such that the reservoir is formed therein. The plurality of nozzles may be arranged in said cover portion facing the stator end-windings. The cover portion can be formed as separate part, for example as an annular cover plate, that may be connected to the base member by suitable connecting means, for example with screws or bolts, without being limited thereto. Sealing means, for example in the form of one or more O-rings, may be provided to seal the annular reservoir towards the inner chamber of the motor housing.

The fluid chamber further includes an inlet through which the cooling fluid can be pumped into the reservoir. For supplying the reservoir of the axial cooling arrangement with a cooling fluid, a controllable pump that is connected with the reservoir by an inlet may be provided. The fluid is provided to cool and/or lubricate the end windings and other rotating components of the electric motor. In the context of this disclosure a cooling fluid which may be an oil, for example. In an embodiment in which the electric motor is part of an electric transmission assembly for driving a motor vehicle, the cooling fluid of the electric motor may be shared with the transmission. However, it will be understood that separate fluids for the electric motor on the one hand, and the transmission, on the other, may also be used.

According to an example embodiment, the nozzles may be provided with spiral features respectively, such that the cooling fluid is caused to spin when passing through the spiral features to the respective nozzles. The spiral features are formed such that the fluid is made to spin and turbulence. The liquid flow is thus dispersed into a spray of small droplets, which have a particularly high cooling capacity for cooling the copper end windings and other adjacent and connected components of the electric motor. The spiral features may be designed as a plurality of non-circular holes in a disc, wherein the disc may be connected to the cover plate such that the spiral features are aligned with the nozzles in circumferential direction. Further, the spiral features may each comprise a central opening and a plurality of spiral-like channels extending radially outwardly therefrom, wherein a diameter of the central opening of the spiral features is larger than a diameter of the respective nozzle of the annular side wall. The spiral features improve the velocity and distribution of the spray with minimal pumping power, in a compact form.

In an embodiment, the axial cooling arrangement may further comprise a feeding plate including a plurality of feeding elements distributed in circumferential direction. The plurality of feeding elements may be aligned with the plurality of spiral features in axial direction with regard to the nozzle axis and/or rotational axis. The feeding elements may interact with the spiral elements such that the fluid being supplied from the reservoir has less pressure when it reaches the spiral features. For example, each feeding element may include a plurality of holes, with each hole being fluidically connected to a radial outer end of the spiral like channels of the respective spiral feature for supplying same with fluid. The cover plate with the nozzles, the disc with the spiral features, and the feeding plate with feeding features form a sandwich structure, such that the fluid flows through the feeding features to the spiral features, where it experiences a spinning and turbulence effect, and then exits the respective nozzle as a spray with very fine droplets. The cover plate, the disc and/or the feeding plate may be made of sheet metal, for example made of steel, stainless steel or aluminium, wherein the respective holes can be cut into the sheet metal by stamping or laser cutting, for example.

In an embodiment, a radial cooling arrangement may be arranged in the motor housing radially outside and axially overlapping one of the first and second stator end-windings, wherein the radial cooling arrangement comprises a plurality of radial nozzles distributed over the circumference and directed radially inwards towards said one of the first and second stator end-windings. In this connection the radial direction refers to the axis of rotation of the rotor. The radial cooling arrangement is configured to spray cooling fluid radially inwardly onto the stator end-windings. By providing a radial cooling arrangement in addition to the axial cooling arrangement results in even higher cooling properties for the electric motor.

It is to be understood that the radial cooling arrangement can be designed equivalent to the axial cooling arrangement so that any feature described above in connection with the axial cooling arrangement may also be implemented in a similar manner in the radial cooling arrangement. Furthermore, as for the axial cooling arrangement, a radial cooling arrangement may be provided for each side of the stator, i.e., a first radial cooling arrangement surrounding the first stator end-windings and a second radial cooling arrangement surrounding the second stator end-windings.

The radial cooling arrangement can comprise an annular reservoir in a casing portion of the motor housing, an inlet through which the cooling fluid can be pumped into the annular reservoir, and a sleeve portion closing the annular reservoir, wherein the plurality of radial nozzles may be provided in said sleeve portion. The nozzles may be provided with spiral features respectively, such that the cooling fluid is caused to spin when passing through the spiral features to the respective radial nozzles. The spiral features may be formed as a plurality of non-circular holes in a sleeve ring, wherein the sleeve ring is arranged at an outer circumferential face of the sleeve portion such that the spiral features are aligned in radial direction with the radially orientated nozzles. Furthermore, the radial cooling arrangement can comprise a feeding ring comprising a plurality of feeding elements distributed over the circumference, wherein the feeding ring is arranged so as to surround the sleeve ring such that the plurality of feeding elements are aligned with the plurality of spiral features. The feeding ring may interact with the spiral elements such that the fluid being fed from the reservoir has less pressure when it reaches the spiral features in the sleeve ring. Each feeding feature may include a plurality of holes, with each hole being fluidically connected to an outer end of the spiral like channels of the respective spiral feature for supplying same with fluid. The sleeve portion including the nozzles, the sleeve ring including the spiral features, and the feeding ring including the feeding features may form a sandwich structure. Thus, the fluid flows through the feeding features to the spiral features, where it experiences a spinning and turbulence effect, and then exits the respective nozzle as a spray with very fine droplets. The sleeve portion, the sleeve ring, and/or the feeding ring may be made of sheet metal, for example made of steel, stainless steel or aluminium, wherein the respective holes can be cut into the sheet metal by stamping or laser cutting, for example.

The inlet of the radial cooling arrangement can be connected to the same pump as for the axial cooling arrangement.

The above object is further solved by a method of cooling an electric motor, which may be configured according to any one of the above embodiments, wherein the axial cooling arrangement is supplied with cooling fluid by a controllable pump as a function of at least one of the torque, the speed, the temperature, and/or the reaction time of the electric motor.

Controlling the fluid amount during operation allows a reduction of the energy consumed in pumping, by tailoring the pressure to suit the varying temperature related viscosity, and requirements for cooling which constantly change during the varying duty cycle of the system. For example, algorithms may be used based on sensing inputs and look-up tables which are able to determine the minimum requirements for the cooling systems—and hence will be able to reduce the power consumed. For example, the pressure of the pump may be controlled in a high pressure mode at high temperatures of the electric motor, and in a low pressure mode at low temperatures of the electric motor. For example, if the temperature of any of the components of the electric motor exceeds a certain value, for example the temperature of the wiring exceeds 150° C. or 160° C., the pump may be controlled in a high-pressure mode, for example above 2 bar or, wherein the pump is fully energised and thus a high cooling can be achieved. If the temperature of any of the components of the electric motor is below a certain value, for example the temperature of the wiring is below 140° C. or 150° C., the pump may be controlled in a low pressure mode, for example below 2 bar or even below 1.5 bar, wherein the pump is only partially energised and thus a less cooling adapted to the requirements is achieved. The pump may be controlled so as to be switchable between a fully on and a fully off mode, and/or one or more modes therebetween. The transmission and the electric motor can share the same oil, or as an alternative, also different oils can be used.

BRIEF SUMMARY OF THE DRAWINGS

An example is shown in the drawings and will be described with respect to the drawings.

FIG. 2 shows an axial cooling arrangement of the electric motor of FIG. 1 in an exploded perspective view;

FIG. 3 shows a detail of axial cooling arrangement of the electric motor of FIG. 1 in a perspective sectional representation;

FIG. 4 shows a nozzle of the axial cooling arrangement of the electric motor of FIG. 1 as a detail;

FIG. 5 shows a nozzle and spiral feature of the axial cooling arrangement of the electric motor of FIG. 1 as a detail;

DESCRIPTION

Figure 1:
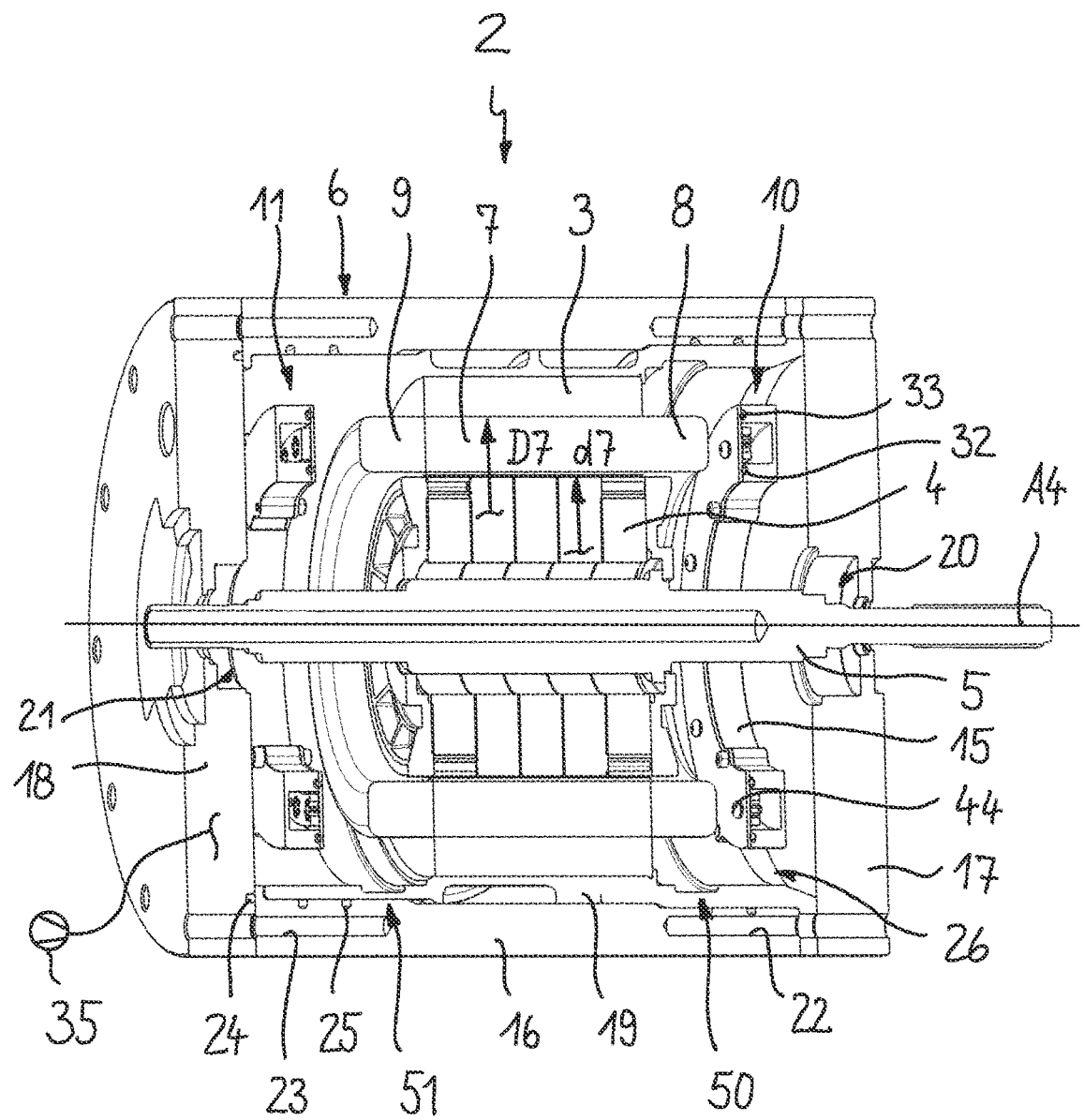
FIG. 1 shows an example electric motor in a longitudinal section in a perspective view.

The FIGS. 1 to 9, which will be described jointly below, show an example electric machine 2.

The electric machine 2 comprises a stator 3 and a rotor 4 that is rotatable relative to the stator 3 and that drives a driveshaft 5 connected thereto when the electric machine 2 is energized. The stator 3 and the rotor 4 are arranged in a motor housing 6, wherein the stator is connected to the motor housing 6 so as to be rotationally fixed thereto, and the rotor is supported in the housing 6 so as to be rotatable about an axis of rotation A4. The rotor 4 may be configured, for example, as a stack of rotor laminations mounted on the driveshaft 5. The electric machine 2 can be configured as a synchronous or asynchronous machine. The rotary motion of the driveshaft 5 can be transmitted to any further drive unit located downstream in the power path, such as a transmission or power distribution unit.

The housing 6 includes a substantially cylindrical part 16 and, at opposite ends thereof, first and second housing side parts 17, 18 connected therewith. It can be seen that the driveshaft 5 is rotatingly supported in the side parts 17, 18 of the housing by means of bearings 20, 21. The side parts 17, 18 can thus also be referred to as bearing shields or end shields. The side parts 17, 18 can be fixed to the cylindrical part by suitable connecting means, such as bolts to be screwed into respective bores 22, 23, or by welding. As an option, a sleeve-like stator carrier 19 can be connected to the housing 6, however, the stator may also be directly connected to the housing. Seals 24, 25, for example O-rings, are provided between the interconnected housing parts 16, 17, 18, 19 to seal the motor chamber 26 enclosed by the housing 6 to the outside. It is to be understood that the housing could also have a different design; for example, it could comprise a cup-shaped part with only one opening that is closed by a cover-shaped part.

The electric machine 2 may serve for example as a drive source for driving a drive axle of a motor vehicle, and may be controlled by means of power electronics, such as a pulse inverter with an integrated electronic control unit (ECU). The electric machine 2 can be supplied from a current controlling source (not shown). An electric machine 2 can operate in a motor mode, wherein electrical energy is converted into mechanical energy to drive the driveshaft 5 and the components drivingly connected thereto, or in a generator mode, wherein, conversely, mechanical energy is converted into electrical energy which can then be stored in the battery. In the present disclosure the electric machine is also referred to as electric motor.

The stator 3 includes an electrical winding 7 forming a first end-winding 8 at a first side of the stator and a second end-winding 9 at the opposite second side of the stator. The stator can be sprayed with a fluid, for example oil or other fluid with high dielectric strength, thermal conductivity and/order specific heat capacity, via a first axial cooling arrangement 10 located axially adjacent to the first end-winding 8, and a second axial cooling arrangement 11 located axially adjacent to the second end-winding 9. The first and second cooling arrangements 10, 11 are arranged in the motor housing 6 so as to radially overlap with the respective stator end-windings 8, 9. For this, at least a portion of the axial cooling arrangement 10, 11, for example the nozzles 12, are arranged between the inner diameter d7 and the outer diameter D7 of the electrical windings 7, respectively the first and second stator end-windings 8, 9. The first and second axial cooling arrangements 10, 11 have the same design in the present example. Therefore, one of the axial cooling arrangements (10, 11) is described exemplary, whereby it will be understood that the features described are equally applicable to the other one of the axial cooling arrangements (11, 10). However, it will be understood, that the axial cooling arrangements can also have designs differing from each other.

The axial cooling arrangement 10, 11 has a fluid chamber 13 formed by a small fluid reservoir 14, and a plurality of nozzles 12 distributed over the circumference in a side face of the fluid chamber. The nozzles 12 are directed towards the respective stator end-windings 8, 9, wherein the nozzle axes A12 can respectively extend parallel to the axis of rotation A4 or can enclose an angle of up to 20° with a parallel to same. The spray angle may include an angle with the nozzle axes A12 of up to ±45°, for example.

It can be seen for example in FIGS. 2 and 3 that the fluid chamber 13 is formed by a ring housing such that the drive shaft 5 can extend through a central through-opening 15 of the annular cooling arrangement 10, 11. The ring housing can be connected to the motor housing 6, for example to the respective side part 17, 18 of the housing 6. The ring housing defines an annular reservoir 14 for the cooling fluid, with the circumferentially distributed nozzles 12 being arranged opposite to the stator end-windings 9, 10. The ring housing includes a base member 28 connected to the motor housing 6 and an annular cover plate 29 fixed to the base member such that the reservoir 14 is formed therein. The cover plate 29 is configured as a disc element which is fixed to the base member 28 by bolted connections 30, 31, with seals 32, 33 being arranged between the interconnected parts, so as to seal the reservoir 14 to the inner chamber 26 of the motor housing 6.

The annular housing further includes an inlet 34 through which the cooling fluid can be pumped into the reservoir 14. A pump 35 (shown schematically) may be provided for supplying the first and/or second axial cooling arrangement 10, 11 with a cooling fluid. The fluid is configured to cool and/or lubricate the end windings 8, 9 and other rotating components of the electric motor 2. For example, an oil may be used as cooling fluid, which can be separate from, or shared with, another driveline component connected to the electric motor 6.

Figure 7:
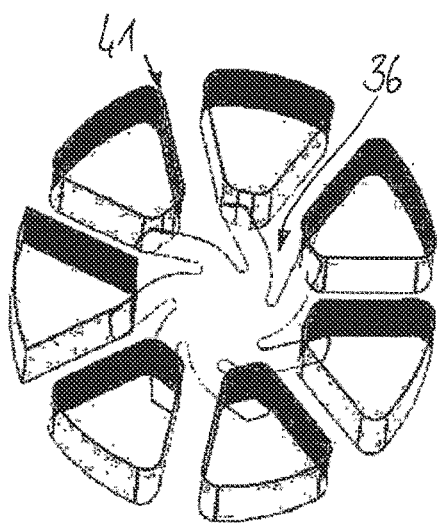
FIG. 7 shows a nozzle arrangement of the axial cooling arrangement of the electric motor of FIG. 1 as a detail.

As can be seen for example in FIGS. 2, 5 and 7, each nozzle 12 is provided with a spiral feature 36, such that the cooling fluid is caused to spin when passing through the spiral features 36 to the respective nozzle 12. The liquid flow is thus dispersed into a spray of small droplets, which have a particularly high cooling capacity for cooling the end windings 8, 9 and other components of the electric motor. As can be seen especially in FIG. 5, each spiral feature 36 comprises a central through-opening 37 and a plurality of spiral-like channels 38 extending in an arcuate manner outwardly therefrom. The number and form of spiral-like channels 38 can be configured as desired or required, wherein a number of two or more spiral-like channels can be used that are circumferentially distributed. The inner diameter d37 of the central opening 37 is larger than the inner diameter d12 of the respective nozzle 12. The spiral features 36, which can also be referred to as spiral elements, are provided as through-openings in a disc 39 being connected to the cover plate 29.

Figure 6:
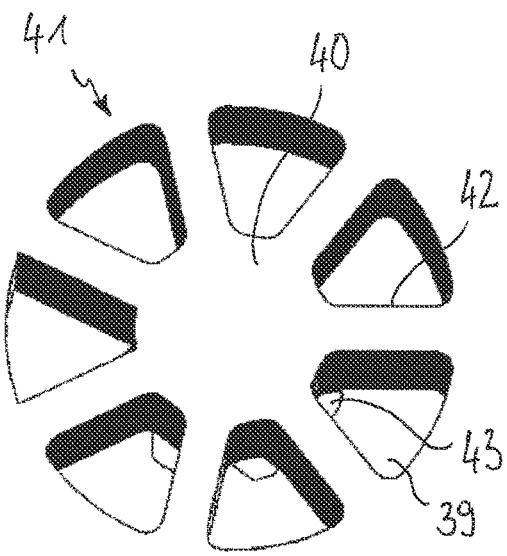
FIG. 6 shows a feeding element with underlying spiral feature of the axial cooling arrangement of the electric motor of FIG. 1 as a detail.

Furthermore, as can be seen for example in FIGS. 2, 6 and 7, the axial cooling arrangement 13 optionally further includes a feeding plate 40 with a plurality of feeding elements 41 distributed in circumferential direction. FIG. 7 shows a spray generator unit comprising a nozzle 12, a spiral element 36, and a feeding element 41, which are arranged so as to be aligned in axial direction with respect to the nozzle axis A12. Thus, the cooling fluid can flow from the reservoir 14 through the openings of the feeding element 41 into the channels of the spiral element 36 and then to the nozzle 12. The feeding elements 41 interact with the spiral elements 36 such that the fluid being fed from the reservoir 14 has less pressure when it reaches the spiral features. Each feeding element 41 includes a plurality of holes 42, with each hole being fluidically connected to a radial outer end 43 of a respective one of the spiral like channels 38. Thus, the number of holes 42 corresponds with the number of channels 38.

The cover plate 29, the spiral feature disc 39, and/or the feeding plate 40 can be made of sheet metal, wherein the respective openings can be cut into the sheet metal by stamping or laser cutting, for example. The cover plate 29, the spiral feature disc 39 and the feeding plate 40 form a sandwich structure, wherein the plates can be connected to each other by suitable means, such as bolted connections 44 distributed over the circumference. The fluid flows through the feeding elements 41 to the spiral elements 36, where it experiences a spinning and turbulence effect, and then exits the respective nozzle 12 as a spray with very fine droplets. Thus, the velocity and distribution of the spray is improved with minimal pumping power, in a compact form.

Figure 8:
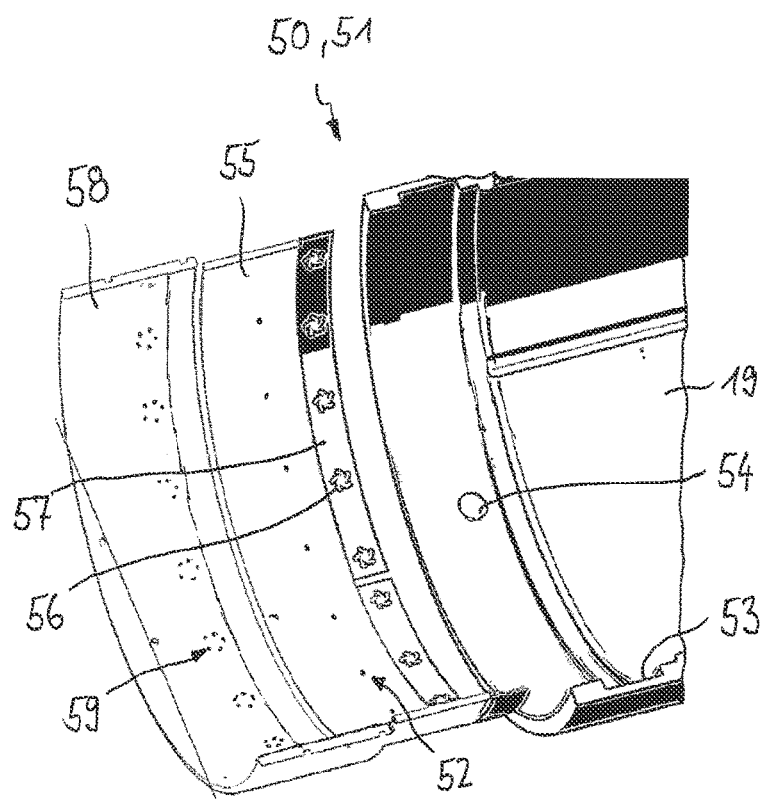
FIG. 8 shows a section of a radial cooling arrangement of the electric motor of FIG. 1 in an exploded perspective view.
Figure 9:
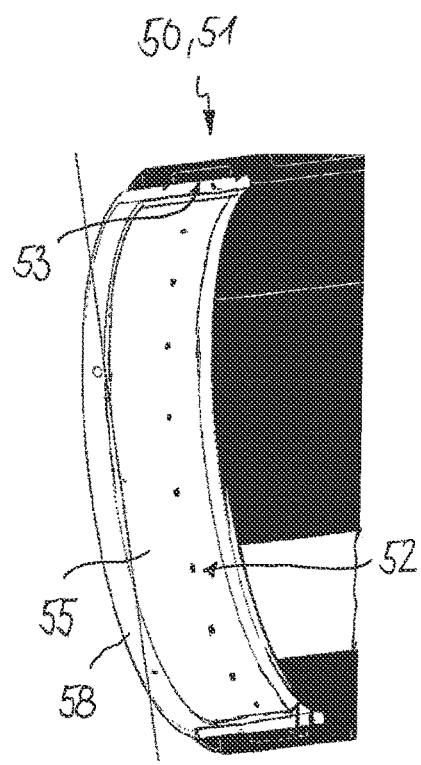
FIG. 9 shows the radial cooling arrangement of FIG. 8 in a mounted condition in a perspective sectional representation.

The electric machine 2 further includes a first and second radial cooling arrangements 50, 51 which are shown as a detail in FIGS. 8 and 9. The first and second cooling arrangements 50, 51 are arranged in the motor housing 6 so as to axially overlap the respective stator end-windings 8, 9. For this, at least a portion of the radial cooling arrangement 50, 51, for example the nozzles 52, are arranged between a side face 46, 47 of the stator 46 and the axial outer end of the respective end-winding 8, 9. The first and second radial cooling arrangements 50, 51 have the same design. Therefore, one of the radial cooling arrangements (50, 51) is described exemplary, whereby it is to be understood that the features described are equally applicable to the other radial cooling arrangement (51, 50). However, it is to be understood that the radial cooling arrangements can also have designs differing from each other.

The radial cooling arrangement 50, 51 is arranged in the motor housing 6 so as to surround the respective end-winding 8, 9. The radial cooling arrangement 50, 51 comprises an annular reservoir 53 in the carrier portion 19 of the motor housing 6, an inlet 54 through which the cooling fluid can be pumped into the annular reservoir 53, and a sleeve portion 55 closing the annular reservoir 53. It can be seen in FIGS. 8 and 9 that the plurality of radial nozzles 52 are provided in the sleeve element 55. Each nozzle 52 is provided with a respective spiral feature 56, such that the cooling fluid is caused to spin when passing through the spiral feature to the nozzle. The spiral features 56 are formed as a plurality of openings in a sleeve ring 57, wherein the sleeve ring is arranged at an outer circumferential face of the sleeve element 55 such that the spiral features 56 and the radial nozzles 52 are aligned to each other in radial direction with respect to the axis of rotation A4. The radial cooling arrangement 50, 51 optionally includes a feeding ring 58 with a plurality of feeding elements 59 distributed over the circumference. The feeding ring 58 is arranged so as to surround the sleeve ring 57 such that the plurality of feeding elements 59 are aligned with the plurality of spiral features 56. The feeding ring 58 interacts with the spiral elements 56 such that the fluid being fed from the reservoir 53 has less pressure when it reaches the spiral elements. Each feeding element 59 may include a plurality of holes, with each hole being fluidically connected to an outer end of the spiral like channels of the respective spiral element 56 for supplying same with fluid. The feedings elements 59 and spiral elements 56 of the radial cooling arrangements 50, 51 can be formed as shown in FIGS. 5, 6 and 7, respectively.

The sleeve element 55, the sleeve ring 57 and the feeding ring 58 form a sandwich structure. The fluid flows through the feeding elements 59 to the spiral elements 56, where it experiences a spinning and turbulence effect, and then exits the respective nozzle 52 as a spray with very fine droplets. The sleeve element 55, the sleeve ring 57 and/or the feeding ring 58 may be made of sheet metal, wherein the respective openings can be cut into the sheet metal by stamping or laser cutting, for example. The inlet 54 of the radial cooling arrangement 50, 51 can be connected to the same pump 35 as the first and/or second axial cooling arrangement 10, 11.

Any one of the first and second axial cooling arrangements 10, 11 as well as the first and second radial cooling arrangements 50, 51 of the electric motor 2 can be controlled by a method of cooling, such that the respective cooling arrangement 10, 11, 50, 51 is supplied with cooling fluid by the controllable pump 35 as a function of at least one of the torque, the speed, the temperature, and/or the reaction time of the electric motor 2.

Controlling the fluid amount of the cooling fluid during operation allows a reduction of the energy consumed in pumping, by tailoring the pressure to suit the varying temperature related viscosity, and requirements for cooling which constantly change during the varying duty cycle of the system. For example, algorithms may be used based on sensing inputs and look-up tables which are able to determine the minimum requirements for the cooling arrangements—and hence will be able to reduce the power consumed. For example, the pressure of the pump 35 may be controlled in a high-pressure mode at high temperatures of the electric motor 2, and in a low-pressure mode at low temperatures of the electric motor. For example, above a temperature of 150° C. any of the components of the electric motor, the pump may be controlled in a high-pressure mode, for example above 2 bar. Below a temperature of 150° C. of any of the components, the pump may be controlled in a low-pressure mode, for example below 2 bar.

Figure 10:
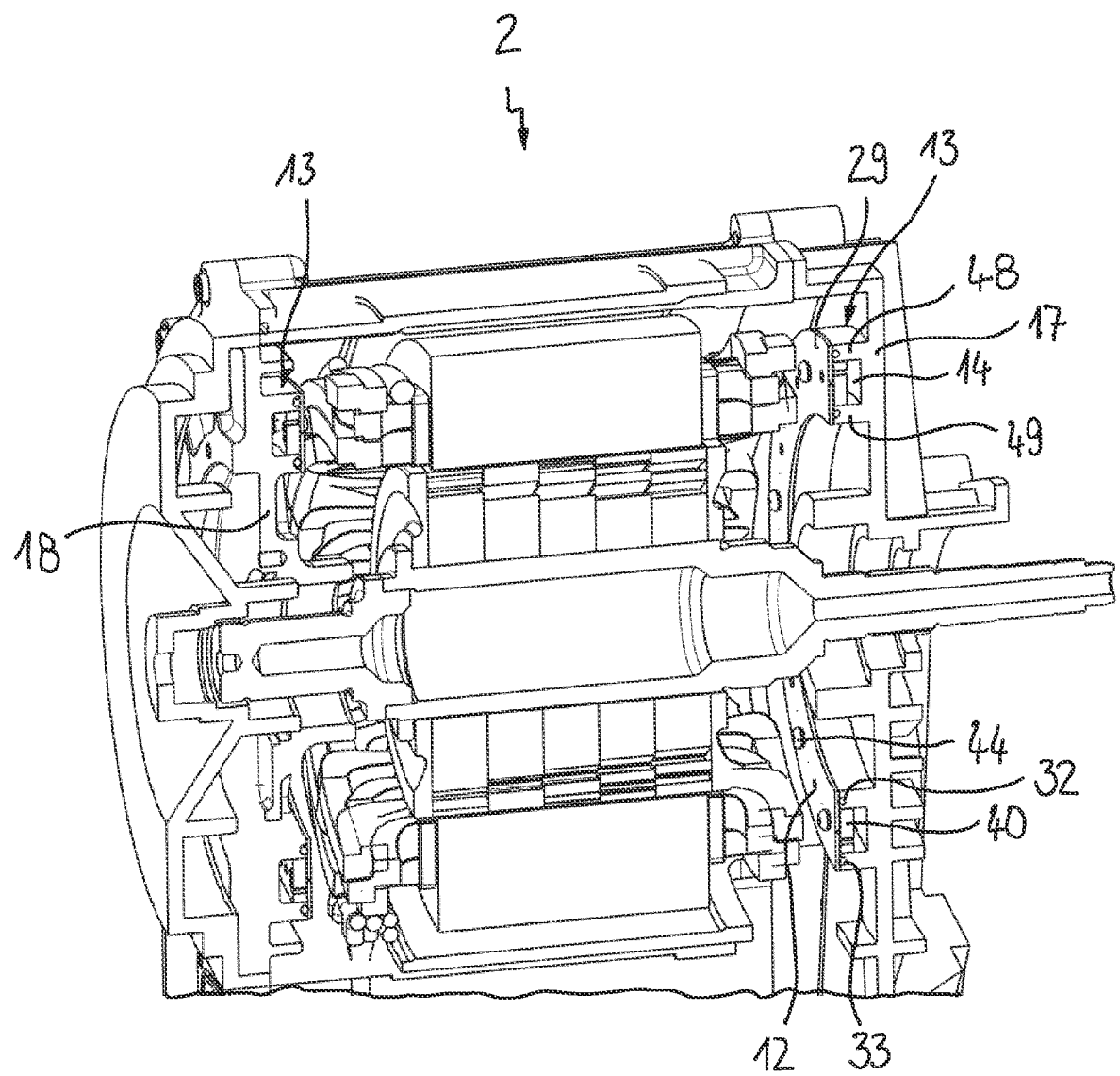
FIG. 10 shows a second example of an electric motor in a longitudinal section in a perspective view.

FIG. 10 shows a second example of an electric motor 2 in a longitudinal section in a perspective view. This example largely corresponds to the example shown in FIGS. 1 to 9 so that reference is made to the above description. Herein, the same or corresponding details have been given the same reference signs as in the Figures above.

A feature of the example according to FIG. 10 is that the housing side parts 17, 18 are integrally formed with a respective fluid chamber 13. In other words, the housing side parts 17, 18 include, in one piece, an outer ring portion 48 and an inner ring portion 49 between which the annular reservoir 14 for the cooling fluid is formed. The annular reservoir 14 can be closed by a cover plate 29, with a feeding element 41 connected thereto, as described above in connection with FIGS. 1 to 9.

Figure 11:
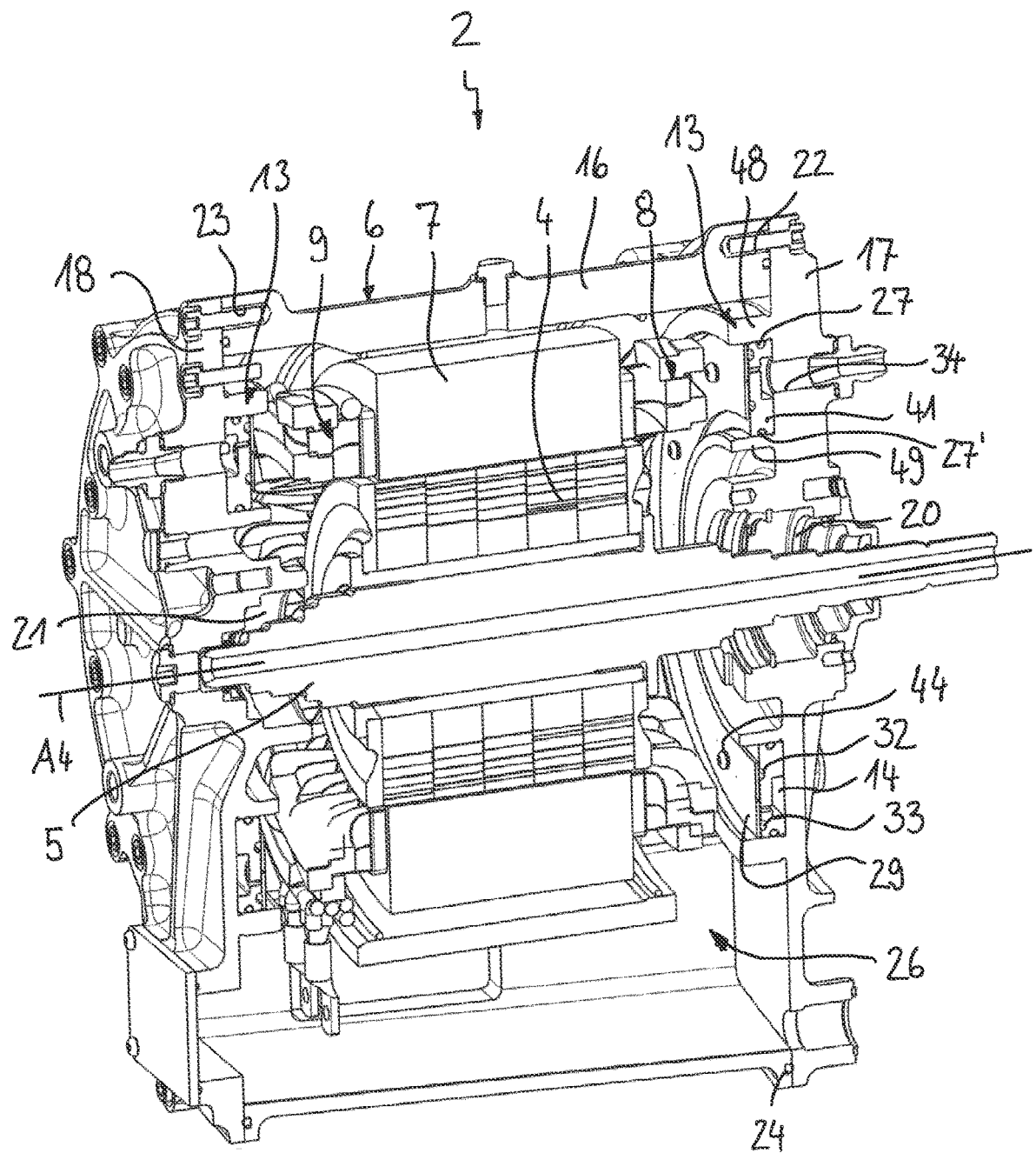
FIG. 11 shows third example of an electric motor in a longitudinal section in a perspective view.

FIG. 11 shows another example of an electric motor 2. This example largely corresponds to the example shown FIG. 10 that reference is made to the above description of FIG. 10, respectively FIGS. 1 to 9. Herein, the same or corresponding details have been given the same reference signs as in the Figures above.

A feature of the example according to FIG. 11 is that the housing side parts 17, 18 are formed so as to integrally include the respective fluid chamber 13. In other words, the housing side parts 17, 18 include, in one piece, an outer ring portion 48 and an inner ring portion 49 between which the annular reservoir 14 for the cooling fluid is formed. The annular reservoir 14 can be closed by a cover plate 29, with a feeding element 41 connected thereto, as described above. In this example, the cover plate 29 is inserted into the chamber formed between the outer and inner ring portion 48, 49. The feeding element 41 is sealed by respective seals 32, 33, 27, 27'.

Figure 12:
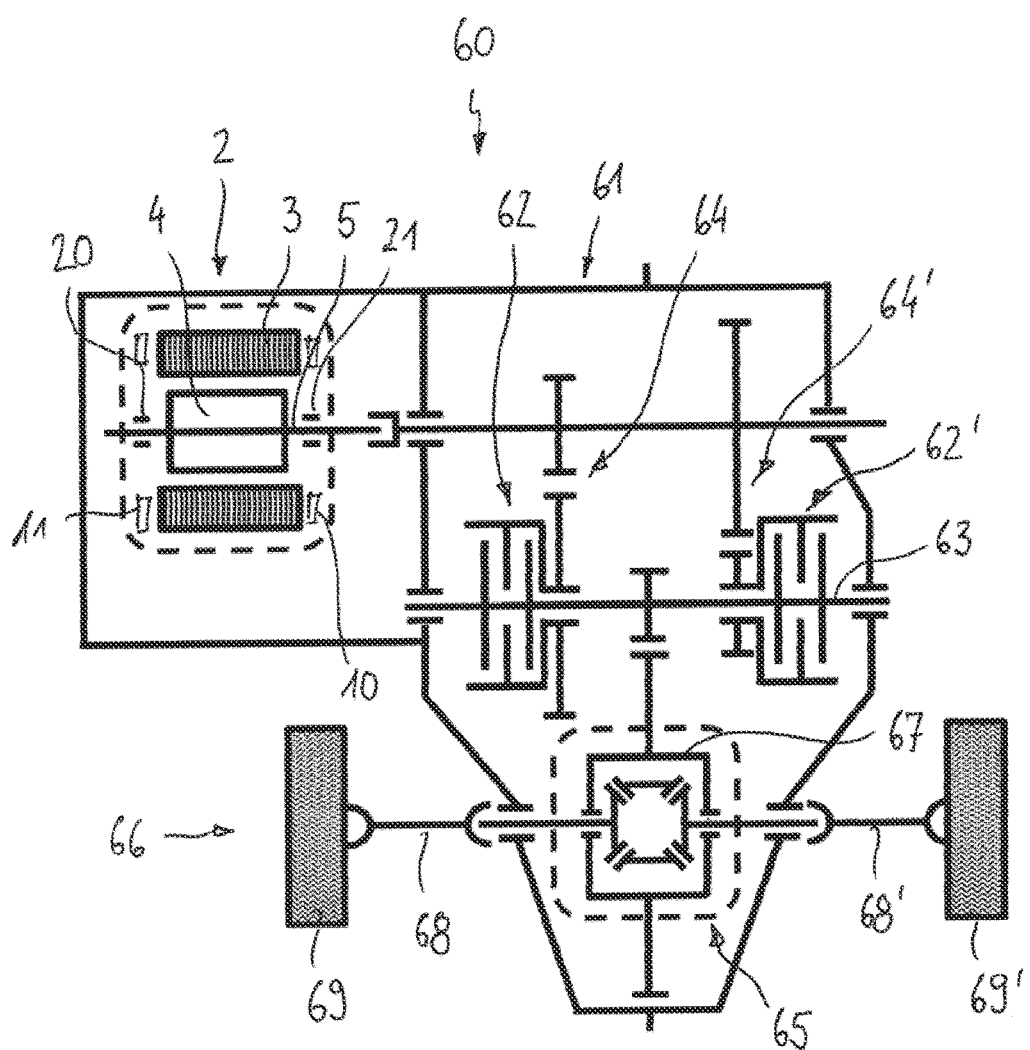
FIG. 12 shows an example drive assembly with an electric motor in a schematic representation.

FIG. 12 shows an electric drive assembly 60, which can also be called an electric drive for short. The electric drive assembly 60 comprises an electric machine 2, as shown in FIG. 1 to 9, or as shown in FIG. 10 or FIG. 11, and a transmission unit 61 driven by the electric machine 2.

Torque introduced into the transmission unit 61 by the electric machine 2 can be transmitted by means of the first clutch arrangement 62 or the second clutch arrangement 62' to the intermediate shaft 63 either via the first transmission stage 64 or the second transmission stage 64', so that the differential gearing 65 and the corresponding drive axle 66 of the motor vehicle can be driven in two different speed ranges. The intermediate shaft 63 is drivingly connected to a differential carrier 67 of the differential gearing 65. By means of the differential gearing 65, the torque introduced is split up to the two side shafts 68, 68' for driving the vehicle wheels 69, 69'.

LIST OF REFERENCE SIGNS 2 electric machine
3 stator
4 rotor
5 driveshaft
6 motor housing
7 electrical winding
8 first end-winding
9 second end-winding
10 first axial cooling arrangement
11 second axial cooling arrangement
12 nozzles
13 fluid chamber
14 reservoir
15 through-opening
16 cylindrical part
17 side part
18 side part
19 stator carrier
20, 21 bearing
22, 23 bore
24, 25 seal
26 motor chamber
27, 27' seal
28 base member
29 cover plate
30 threaded hole
31 bolt
32, 33 seal
34 inlet
35 pump
36 spiral feature
37 opening
38 channel
39 disc
40 feeding plate 41 feeding element
42 hole
43 outer end
44 bolted connection
46, 47 side face
48, 49 ring portion
50 first radial cooling arrangement
51 second radial cooling arrangement
52 nozzle
53 reservoir
54 inlet
55 sleeve element
56 spiral features
57 sleeve ring
58 feeding ring
59 feedings elements
60 electric drive assembly
61 transmission unit
62, 62' clutch arrangement
63 intermediate shaft
64, 64' transmission stage
65 differential gearing
66 drive axle
67 differential carrier
68 side shaft
69 wheel
A axis
D, d diameter

The invention claimed is:

1. An electric motor comprising:
a motor housing;
a stator connected to the motor housing, wherein the stator comprises first stator end-windings and second stator end-windings;
a rotor rotatable relative to the stator;
a driveshaft connected to the rotor in a rotationally fixed manner, wherein the driveshaft is rotatably supported in the motor housing about an axis of rotation;
an axial cooling arrangement arranged axially adjacent and radially overlapping one of the first stator end-windings and the second stator end-windings, wherein the axial cooling arrangement comprises a fluid chamber with a plurality of nozzles distributed in circumferential direction and directed towards said one of the first stator end-windings and second stator end-windings; and
a pump to supply the axial cooling arrangement with cooling fluid;
wherein the pump is controllable as a function of at least one of the torque, the speed, the temperature, or the reaction time of the electric motor;
wherein the pressure of the pump is controlled in a high-pressure mode at high temperatures of the electric motor, and in a low-pressure mode at low temperatures of the electric motor.

2. The electric motor of claim 1,
wherein the fluid chamber is arranged in the motor housing coaxially to the driveshaft and defines an annular reservoir; and
wherein the fluid chamber includes an inlet through which the cooling fluid can be pumped into the annular reservoir, and a cover portion that closes said annular reservoir, wherein the plurality of nozzles are arranged in the cover portion so as to face said one of the first and second stator end-windings.

3. The electric motor of claim 1, wherein a cover portion is firmly connected to a base member of the fluid chamber, thereby forming the annular reservoir, wherein the annular reservoir is sealed.

4. The electric motor of claim 1, wherein the driveshaft extends through a central through-opening of the axial cooling arrangement.

5. The electric motor of claim 1, wherein the nozzles are provided with respective spiral features such that the cooling fluid spins when passing through the spiral features to the respective nozzles.

6. The electric motor of claim 5, wherein the spiral features are formed as a plurality of non-circular openings in an annular disc, wherein the annular disc is connected to a cover portion such that the spiral features are aligned with the nozzles.

7. The electric motor of claim 5, wherein the spiral features each comprise a respective central opening and a plurality of spiral-like channels extending therefrom radially outwardly, wherein a diameter of the central opening of the spiral features is larger than a diameter of the respective nozzle in a cover portion.

8. The electric motor of claim 5,
wherein the axial cooling arrangement comprises a feeding plate with a plurality of feeding elements distributed in circumferential direction, wherein the plurality of feeding elements are aligned with the plurality of spiral features.

9. The electric motor of claim 1,
wherein a radial cooling arrangement is arranged in the motor housing radially outside and axially overlapping one of the first stator end-windings and second stator end-windings, wherein the radial cooling arrangement comprises a plurality of radial nozzles distributed over the circumference and directed radially inwards towards said one of the first stator end-windings and second stator end-windings.

10. The electric motor of claim 9, wherein the radial cooling arrangement comprises an annular reservoir arranged in the motor housing, an inlet through which the cooling fluid can be fed into the annular reservoir, and a sleeve element closing the annular reservoir, wherein the plurality of radial nozzles are provided in said sleeve element.

11. The electric motor of claim 9,
wherein the nozzles are provided with respective spiral features, such that the cooling fluid is caused to spin when passing through the spiral features to the respective radial nozzles,
wherein the spiral features are formed as a plurality of non-circular holes in a sleeve ring, wherein the sleeve ring is arranged at an outer circumferential face of the sleeve element such that the spiral features are aligned with the radial nozzles.

12. The electric motor of claim 11, wherein the radial cooling arrangement comprises a feeding ring comprising a plurality of feeding elements distributed over the circumference, wherein the feeding ring is arranged so as to surround the sleeve ring such that the plurality of feeding elements are aligned with the plurality of spiral features.

13. The electric motor of claim 1, wherein at least one of an inlet of the axial cooling arrangements or an inlet of the radial cooling arrangements is connected to a fluid pump that is configured to pump cooling fluid into a respective annular reservoir.

14. The electric motor of claim 1, wherein a first axial cooling arrangement is provided facing the first stator end-windings, and a second axial cooling arrangement is provided facing the second stator end-windings, and/or wherein a first radial cooling arrangement is provided surrounding the first stator end-windings, and a second radial cooling arrangement is provided surrounding the second stator end-windings.

15. An electric motor comprising:

a motor housing;

a stator connected to the motor housing, wherein the stator comprises first stator end-windings and second stator end-windings;

a rotor rotatable relative to the stator;

a driveshaft connected to the rotor in a rotationally fixed manner, wherein the driveshaft is rotatably supported in the motor housing about an axis of rotation;

an axial cooling arrangement arranged axially adjacent and radially overlapping one of the first stator end-windings and the second stator end-windings, wherein the axial cooling arrangement comprises a fluid chamber with a plurality of nozzles distributed in circumferential direction and directed towards said one of the first stator end-windings and second stator end-windings; and a pump to supply the axial cooling arrangement with cooling fluid;

wherein the pump is controllable as a function of at least one of the torque, the speed, the temperature, or the reaction time of the electric motor;

wherein a radial cooling arrangement is arranged in the motor housing radially outside and axially overlapping one of the first stator end-windings and second stator end-windings;

wherein the radial cooling arrangement comprises a plurality of radial nozzles distributed over the circumference and directed radially inwards towards said one of the first stator end-windings and second stator end-windings;

wherein the nozzles are provided with respective spiral features, such that the cooling fluid is caused to spin when passing through the spiral features to the respective radial nozzles;

wherein the spiral features are formed as a plurality of non-circular holes in a sleeve ring, with the sleeve ring arranged at an outer circumferential face of the sleeve element such that the spiral features are aligned with the radial nozzles; and wherein the radial cooling arrangement comprises a feeding ring comprising a plurality of feeding elements distributed over the circumference, with the feeding ring arranged so as to surround the sleeve ring such that the plurality of feeding elements are aligned with the plurality of spiral features.

* * * * *